(12) United States Patent
Dey et al.

(10) Patent No.: US 11,790,265 B2
(45) Date of Patent: Oct. 17, 2023

(54) TRAINING ARTIFICIAL INTELLIGENCE MODELS USING ACTIVE LEARNING

(71) Applicant: International Business Machines Corporation, Armonk, NY (US)

(72) Inventors: Kuntal Dey, New Delhi (IN); Sameep Mehta, New Delhi (IN); Manish Anand Bhide, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 973 days.

(21) Appl. No.: 16/527,530

(22) Filed: Jul. 31, 2019

(65) Prior Publication Data

US 2021/0035014 A1 Feb. 4, 2021

(51) Int. Cl.
*G06N 20/00* (2019.01)
*G06F 18/214* (2023.01)
*G06N 3/08* (2023.01)
*G06N 5/02* (2023.01)
*G06N 3/02* (2006.01)

(52) U.S. Cl.
CPC .......... *G06N 20/00* (2019.01); *G06F 18/214* (2023.01); *G06N 3/08* (2013.01); *G06N 5/02* (2013.01); *G06N 3/02* (2013.01)

(58) Field of Classification Search
CPC ...... G06N 20/00; G06N 7/005; G06N 3/0454; G06N 3/088; G06N 3/02; G06N 20/20; G06N 3/08; G06N 5/02; G06K 9/6256
See application file for complete search history.

(56) References Cited

U.S. PATENT DOCUMENTS

| | | | | |
|---|---|---|---|---|
| 6,298,351 | B1* | 10/2001 | Castelli | G06K 9/6256 707/999.102 |
| 2017/0236058 | A1* | 8/2017 | Cao | G06N 5/02 704/243 |
| 2017/0300805 | A1* | 10/2017 | Bhattacharjee | G06N 3/02 |
| 2017/0330058 | A1 | 11/2017 | Silberman et al. | |
| 2019/0147371 | A1* | 5/2019 | Deo | G06N 20/20 706/12 |

(Continued)

OTHER PUBLICATIONS

Christopher H. Lin et al., "To Re(label), or Not to Re(label)", Copyright 2014, Association for the Advancement of Artificial Intelligence, 8 pages.

(Continued)

*Primary Examiner* — Roberto Borja
(74) *Attorney, Agent, or Firm* — Eric Chesley; Hunter E. Webb; Keohane & D'Alessandro, PLLC (57) ABSTRACT

Aspects of the present invention provide an approach for reducing bias in active learning. In an embodiment, a data point is selected from a training dataset for a current training iteration while monitoring for data bias at each addition of data to a virtual training dataset. In addition, a machine learning model is examined for bias after adding the selected data point to the virtual training dataset. When data bias and/or model bias is detected, the data point is considered for potential label modification. The selected data point is modified and, if the raw value of the modified data point is within a predefined tolerance and within a bin of a desired class, the modified data point having a label of the target class is retained. Otherwise, it can be discarded.

11 Claims, 4 Drawing Sheets

(56) References Cited

U.S. PATENT DOCUMENTS

| | | | |
|---|---|---|---|
| 2019/0272470 A1* | 9/2019 | Bandi | G06F 16/285 |
| 2020/0104849 A1* | 4/2020 | Cai | G06Q 40/00 |
| 2020/0167643 A1* | 5/2020 | Bivens | G06N 3/0427 |
| 2020/0311486 A1* | 10/2020 | Dey | G06F 9/542 |
| 2020/0402058 A1* | 12/2020 | Zhou | G06F 9/542 |

OTHER PUBLICATIONS

Heinrich Jiang et al., "Identifying and Correcting Label Bias in Machine Learning", arXiv:1901.04966v1 [cs.LG], Jan. 15, 2019, 16 pages.
Christopher H. Lin et al., "Re-Active Learning: Active Learning with Relabeling", Copyright 2016, Association for the Advancement of Artificial Intelligence, pp. 1845-1852.
Joseph W. Richards et al., "Active Learning to Overcome Sample Selection Bias: Application to Photometric Variable Star Classification", arXiv: 1106.2832v2 [astro-ph.IM], Jun. 18, 2011, 43 pages.

\* cited by examiner

TRAINING ARTIFICIAL INTELLIGENCE MODELS USING ACTIVE LEARNING

TECHNICAL FIELD

The subject matter of this invention relates generally to machine learning. More specifically, aspects of the present invention provide a solution that reduces bias in active learning in the training of artificial intelligence models.

BACKGROUND

Machine learning is a subfield of computer science that evolved from the study of pattern recognition and computational learning theory in artificial intelligence. Machine learning algorithms build a mathematical model based on sample data, known as "training data", in order to make predictions or decisions without being explicitly programmed to perform the task. Machine learning algorithms are used in a wide variety of applications, such as email filtering, and computer vision, where it is typically infeasible to develop an algorithm of specific instructions for performing the task.

Active learning is a special case of machine learning in which a learning algorithm can interactively query the user (or some other information source) to obtain the desired outputs at new data point. The learning algorithm can potentially achieve a better accuracy while using fewer training labels if allowed to choose the data to learn from. Such an algorithm is referred to as an active learner. As stated, active learners can dynamically pose queries during the training process, usually in the form of unlabeled data instances to be labeled by what is called an oracle, usually a human annotator. One hypothesis in active learning is that if a learning algorithm can choose the data it wants to learn from, it can perform better than traditional methods with substantially less data for training.

SUMMARY

In general, aspects of the present invention provide an approach for reducing bias in active learning. In an embodiment, a data point is selected from a training dataset for a current training iteration while monitoring for data bias at each addition of data to a virtual training dataset. In addition, a machine learning model is examined for bias after adding the selected data point to the virtual training dataset. When data bias and/or model bias is detected, the data point is considered for potential label modification. The selected data point is modified and, if the raw value of the modified data point is within a predefined tolerance and within a bin of a desired class, the modified data point having a label of the target class is retained. Otherwise, it can be discarded.

One aspect of the invention provides a computer-implemented method for reducing bias in active learning, comprising: monitoring, upon adding a selected data point to a virtual training dataset, for data bias in the virtual training dataset; modifying, when data bias is detected, the data point to generate a modified data point; and retaining the modified data point when a raw value of the modified data point is within a bin of a desired class, wherein the desired class includes a class label.

Another aspect of the invention provides a memory medium comprising program instructions; a bus coupled to the memory medium; and a processor, for executing the program instructions, coupled to a reduced bias active learning engine via the bus that when executing the program instructions causes the system to: monitor, upon adding a selected data point to a virtual training dataset, for data bias in the virtual training dataset; modify, when data bias is detected, the data point to generate a modified data point; and retain the modified data point when a raw value of the modified data point is within a bin of a desired class, wherein the desired class includes a class label.

Yet another aspect of the invention provides a computer program product embodied in a computer readable medium that, when executed by a computer device, performs a method for reducing bias in active learning, the method comprising: monitoring, upon adding a selected data point to a virtual training dataset, for data bias in the virtual training dataset; modifying, when data bias is detected, the data point to generate a modified data point; and retaining the modified data point when a raw value of the modified data point is within a bin of a desired class, wherein the desired class includes a class label.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for reducing bias in active learning. In an embodiment, a data point is selected from a training dataset for a current training iteration while monitoring for data bias at each addition of data to a virtual training dataset. In addition, a machine learning model is examined for bias after adding the selected data point to the virtual training dataset. When data bias and/or model bias is detected, the data point is considered for potential label modification. The selected data point is modified and, if the raw value of the modified data point is within a predefined tolerance and within a bin of a desired class, the modified data point having a label of the target class is retained. Otherwise, it can be discarded.

Figure 1:
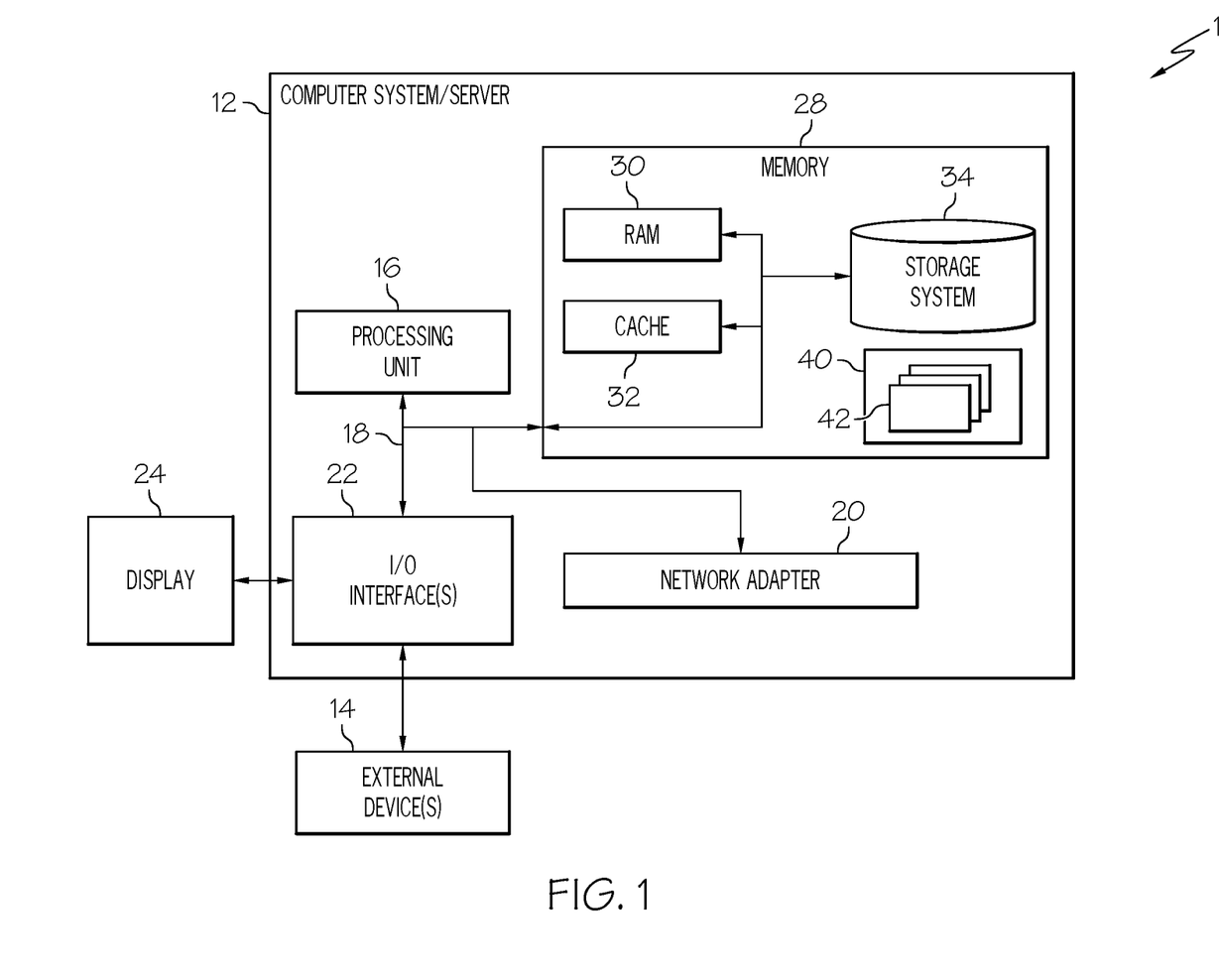
FIG. 1 depicts a data processing system according to an embodiment of the present invention.

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in data processing system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
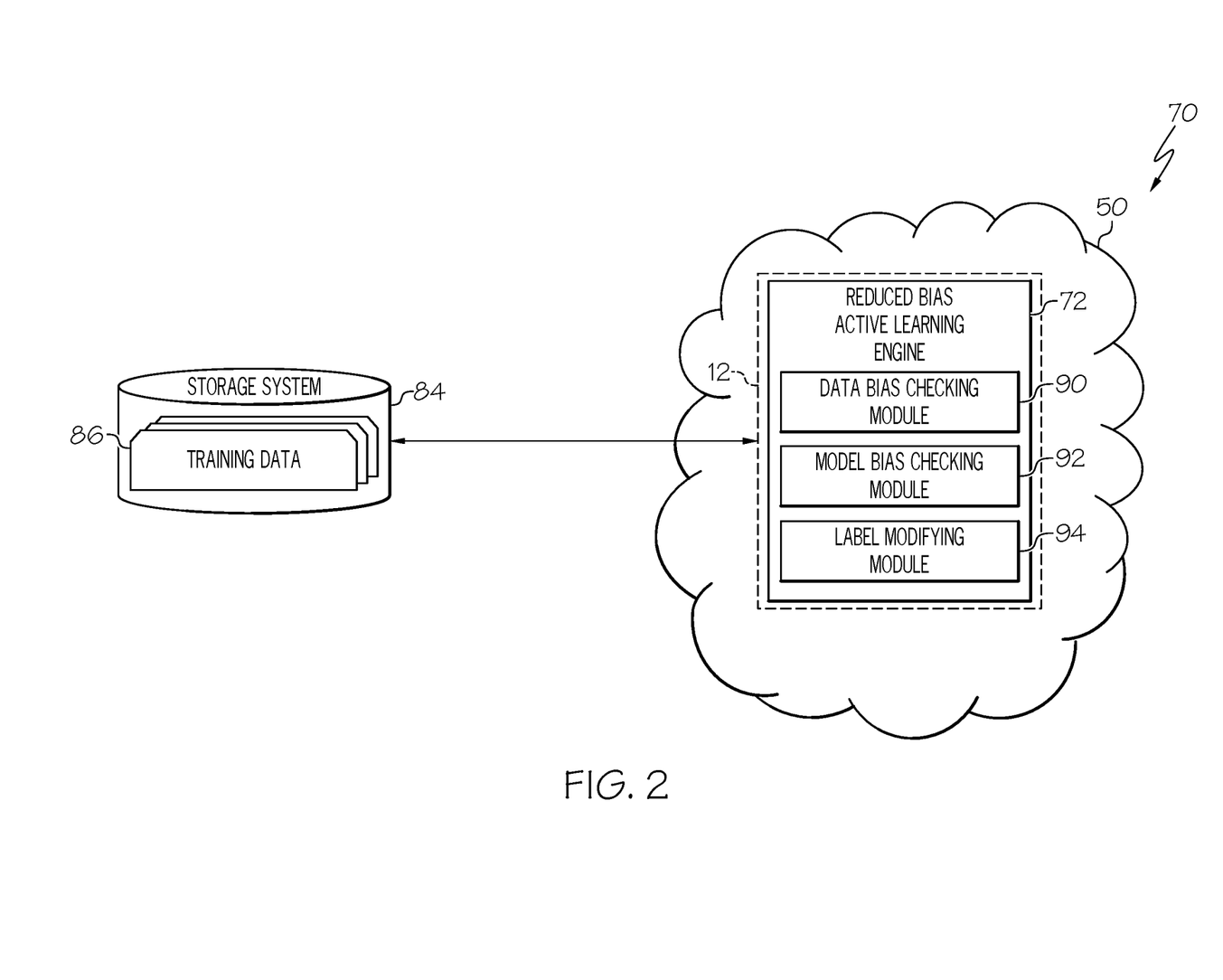
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each equipped user need not have a reduced bias active learning engine (hereinafter "system 72"). Rather, system 72 could be loaded on a server or server-capable device that communicates (e.g., wirelessly) with a user to provide processing therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands to train a machine learning model, such as an active learning artificial intelligence system (e.g., in a cognitive and/or network computing environment). Such other system(s) have not been shown in FIG. 2 for brevity purposes.

Along these lines, system 72 may perform multiple functions similar to a general-purpose computer. Specifically, among other functions, system 72 can reduce bias in active learning. To accomplish this, system 72 can include: a data bias checking module 90, a model bias checking module 92, and label modifying module 94.

Active learning is a special case of machine learning in which a learning algorithm is able to interactively query the user (or some other information source) to obtain the desired outputs at new data points. In statistics literature, it is sometimes also called optimal experimental design. There are situations in which unlabeled data is abundant but manually labeling is expensive. In such a scenario, learning algorithms can actively query the user/teacher for labels. This type of iterative supervised learning is called active learning.

Since the learner chooses the examples, the number of examples to learn a concept can often be much lower than the number required in normal supervised learning. With this approach, there is a risk that the algorithm is overwhelmed by uninformative examples. In the active learning paradigm, an interactive labeling of training data is carried out, with human intervention, wherein the human annotator will label a few of the many data points available, with the intent that the relatively more informative data points are chosen for labeling (as per the human's perception) so that the learning happens quickly and with a relatively lower effort from the human annotator. In recent times, checking for bias/fairness in data and algorithmic models and mitigating such bias to ensure maximal fairness has become of increasing practical and legal significance.

Active learning systems can be brought under this paradigm. As of now, no system or associated method exists such that active learning can be carried out in a fair manner with reduction of choice of training samples that will minimize the potential bias (maximize the potential fairness) in the trained model, via selecting and/or manipulating the training data. In an iteration of learning, the input to this method are a set of data rows that are the next best choice of data input for active learning, using other external factors, such as domain-specifications and an expert's or other user's choice, etc. In a traditional system, this data would directly be consumed by the active learner.

There is no magic bullet to select a data point "without bias". Note, the inventors are proposing that the invention described herein is not required to learn from all the data points, but rather can learn from some of the given input. Thus, this method is does not require a one-shot selection method for all the data points "without bias" to feed into the algorithm (which would be trivial, given that data bias measurement algorithms are already available—it would merely be a question of adding the batch of data and examining for bias). Rather, the invention involves selecting data samples serially, and at-proportion, while monitoring the bias at each addition of data, to reduce training sample choices in order to minimize potential bias (and maximize potential fairness) in a trained model by selecting and/or manipulating training data.

Referring again to FIG. 2, data bias checking module 90 of system 72, as executed by computer system/server 12, is configured to select a data point from training data 86 for a current training iteration while monitoring for data bias at each addition of data. Any methods, now known (e.g., regression slope test, difference of means test, rank tests, etc.) or later developed, can be used to monitor for data bias. Algorithms learn from data and find relationships, develop understanding, make decisions, and evaluate their confidence from the training data they're given. The better the training data is, the better a generated model can perform. Training data 86 can be stored in storage system 84. Storage system 84 can use any type of database structure (e.g., relational, hierarchical, etc.) to store training data 86 used to train a model.

In an embodiment, a value is set representing a number of data attempts (e.g., numDataAttempts). In addition, a value is set representing a number of model attempts (e.g., numModelAttempts). These values can be initially set to 0 for all data points in training data 86. Data bias checking module 90 selects data points (or samples) serially, and at-proportion, while monitoring for data bias at each addition of data. To that end, data bias checking module 90 virtually adds the data point to an existing training data pool and performs data bias checking of this virtual dataset (i.e., existing training data pool plus the newly selected data point) from a data bias perspective.

Generally, machine learning models are predictive engines. An advantage of machine learning models over traditional statistical models is their ability to quickly consume enormous numbers of records and thereby more accurately make predictions. But since machine-learning models predict exactly what they have been trained to predict, their predictions are generally only as good as the data used for their training. To address potential data bias, a first step is to honestly and openly question what preconceptions could currently exist in data gathering processes, and actively hunt for how those biases might manifest themselves in data. Once potential biases are identified, they can be blocked or reduced by eliminating problematic data or removing specific components of the input data set. For example, managers for a credit card company, when considering how to address late payments or defaults, should only keep data directly relevant to whether or not customers will pay their bills, such as data on credit scores or employment and salary information.

That way, a solid machine learning model can be built to predict likelihood of payment and determine which credit card customers should be offered more flexible payment plans and which should be referred to collection agencies. If data bias is found, data bias checking module 90 can add to numDataAttempts (valid for the current training iteration) the number of times this data point has been attempted to be inserted, revert to an earlier version of the machine learning algorithm, and move to selecting a next data point.

Model bias checking module 92 of system 72, as executed by computer system/server 12, is configured to monitor for model bias in a machine learning model. Model bias checking module 92 receives the virtual training data and performs active learning using the machine learning algorithm and the virtual training data. On completion of the active learning, model bias checking module 92 derives a status of the active learning model. Model bias is the difference between an average prediction of the model and the correct value which it is attempting to predict. If model bias is found (e.g., difference exceeds a predefined threshold), model bias checking module 92 can add to numModelAttempts (valid for this iteration) the number of times this data point has been attempted to be inserted, revert to an earlier version of the machine learning algorithm, and move to selecting another data point.

Otherwise, no bias has been detected at any stage. In that case, model bias checking module 92 can commit the data point to an existing testing dataset. Data points not indicating any bias are herein referred to as "inherently fair" data points. The testing dataset is used to provide an unbiased evaluation of a final model fit on the training dataset. In addition, the machine learning algorithm is not reverted due to no bias being detected. In other words, the machine learning algorithm has been further trained using the selected data point.

Once all of the "inherently fair" data samples have been consumed, two options exist. First, the remaining data points can be discarded which can make the training process slower. Also, such discarding might keep repeating, as there is no guarantee that the next chosen training dataset also will not have such biased data samples. Second, attempt to update the data points that can be updated (within tolerable limits), which can make the training process faster. Label tweaking takes the second approach of the two.

Label modifying module 94 of system 72, as executed by computer system/server 12, is configured to modify a class label of a data point before discarding the data point permanently from a training iteration. Labeled data is a group of samples that have been tagged with one or more class labels. Labeling typically takes a set of unlabeled data and augments each piece of that unlabeled data with meaningful tags that are informative. For example, labels might indicate whether a photo contains a horse or a cow, which words were uttered in an audio recording, what type of action is being performed in a video, what the topic of a news article is, what the overall sentiment of a tweet is, etc. Labels can be obtained by asking humans to make judgments about a given piece of unlabeled data (e.g., "Does this photo contain a horse or a cow?"). A label is the outcome of a model function and is a word or phrase indicating that data belongs to a category or class (e.g., email message is spam or not spam).

Label modification can be performed on borderline data, that is, data that satisfies the following properties: (1) the label is continuous data that has been binned to create a category (e.g., an income range, height range, etc.) and (2) the label is sufficiently (within a predefined threshold) close to a pair of class boundaries (e.g., belonging to say class B, but very close to say class A, wherein, a consideration "is to be made" whether the class label can be altered from B to A).

Binning is a way to group a number of more or less continuous values into a smaller number of "bins". For example, if you have data about a group of people, a binning solution may be to arrange their ages into a smaller number of age intervals (for example, grouping every five years together).

Further, classification is the process of predicting the class of given data points. Classification predictive modeling is the task of approximating a mapping function (f) from input variables (x) to discrete output variables (y). For example, spam detection in email service providers can be identified as a classification problem. This is a binary classification since there are only two classes as spam and not spam. A classifier utilizes some training data to understand how given input variables relate to the class. In this case, known spam and non-spam emails must be used as the training data. When the classifier is trained accurately, it can be used to detect an unknown email.

Figure 3:
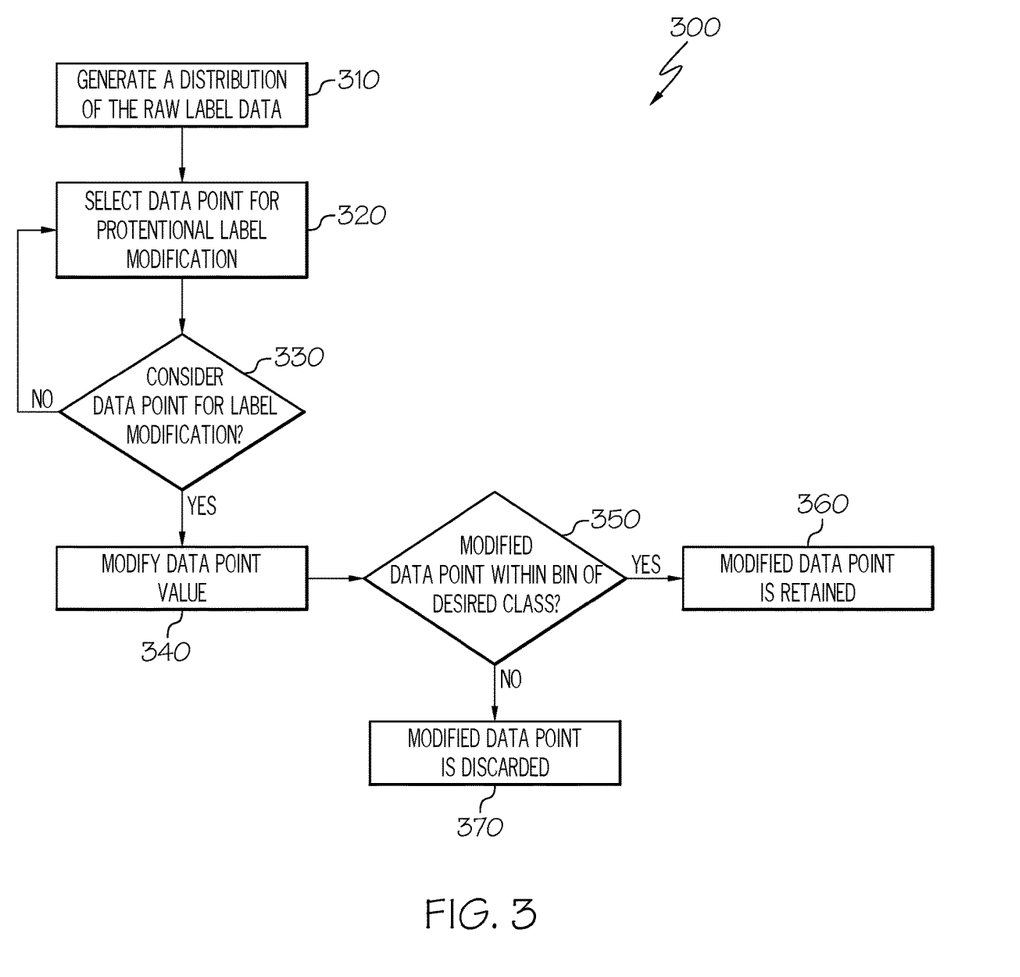
FIG. 3 depicts an example data flow diagram for label modification according to an embodiment of the present invention.

FIG. 3 depicts an example flow diagram of a label modification process. Assume a data point has been looked at number of times (e.g., numAttempts) without success. When the number of attempts reaches a predefined threshold (e.g., numAttempts=5), label modifying module 94 can attempt to classify relatively borderline or ambiguous data into an alternative class. In an embodiment, classification is subject to an approval by a human annotator (e.g., domain expert) in an explicit manner and subject to any policy thresholds. As shown in FIG. 3, at 310, a distribution of the raw label data (i.e., the raw values of the data prior to binning) is generated. In an embodiment, the data distribution is represented by its mean and variance/standard deviation as found by attempting to fit a normal, or Gaussian, curve. The Gaussian distribution is also commonly called the "normal distribution" and is often described as a "bell-shaped curve". If the probability of a single event is p= and there are n=events, then the value of the Gaussian distribution function at value x= is x 10^. In an alternative embodiment, another type of curve can be considered.

At 320, a data point (with label value v) is selected for potential label modification (or tweaking). The data point can be selected based on its previous number of attempts for label modification (e.g., as denoted by a label_modification_attempt_count value) within the data available for label modification. If not already initialized, the data point is associated with meta-data indicating the number of label modification attempts (e.g., set label_modification_attempt_count=0). Once selected, at 330, label modifying module 94 determines whether to consider modifying the label of the selected data point. To that end, assume the standard deviation of the generated distribution is represented by value $\sigma$, a range limit is represented by value $\rho$, and the mean is represented by value $\mu$. Then, the selected data point with raw value v will be considered only if: $(\min(\mu-\sigma, \mu-\rho)>=v)$ and $(\max(\mu+\sigma, \mu+\rho)<=v)$. If considered, then the number representing label modification attempts (e.g., label_modification_attempt_count) for this data is incremented by +1. If not, another data point can be selected for consideration.

Label modifying module 94 can then modify the class label of the selected data point based on a predefined criterion. To that end, at 340, label modifying module 94 generates a random offset number (denoted as $\eta$) is generated within the limit $\rho$ given by a predefined policy threshold. If the raw value of the desired label is greater than the raw value of the current label, then a new number $v'=(v+\eta)$ is generated. Otherwise, a new number $v'=(v-\eta)$ is generated. At 350, label modifying module 94 determines whether $\mu-\sigma<=v'<=\mu+\sigma$, and the raw value of v' is within the bin of the desired class.

If so, at 360, the modified data point having the label of the target class is retained and passed for the "inherently fair" data sample selection process (as described in detail above including checking for data point and model bias) and the raw data sample is eliminated from the training data for the current iteration of the active learning process. Otherwise, at 370, the modified data point is discarded, and the raw data sample is retained in the remaining training data sample set of the current training iteration.

Figure 4:
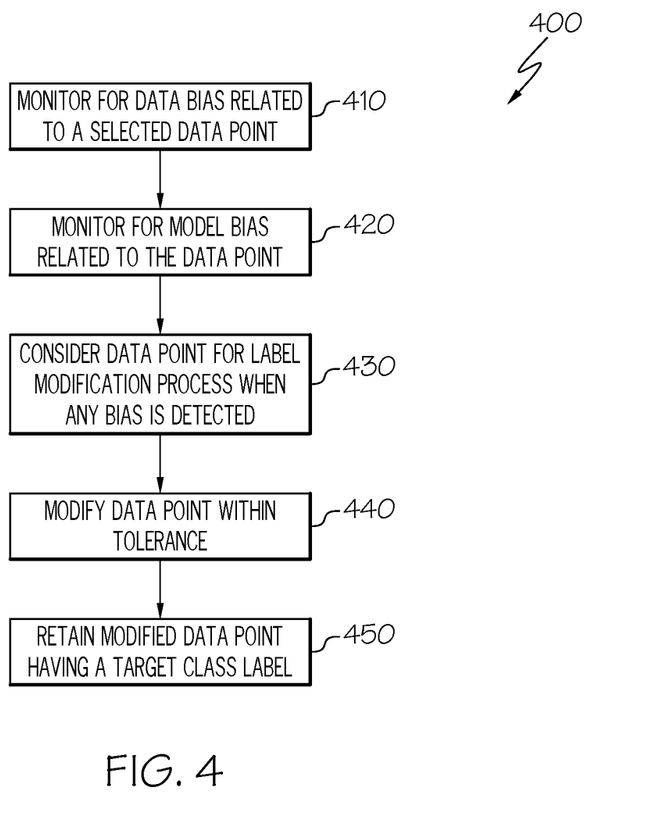
FIG. 4 depicts an example process flowchart according to an embodiment of the present invention.

Referring now to FIG. 4 in conjunction with FIG. 2, a process flowchart 400 according to an embodiment of the present invention is shown. At 410, data bias checking module 90 of system 72, as executed by computer system/server 12, selects a data point from training data 86 for a current training iteration, while monitoring for data bias at addition of the selected data point to a virtual training dataset. At 420, model bias checking module 92 of system 72, as executed by computer system/server 12, monitors for model bias in a machine learning model related to the selected data point. Model bias checking module 92 receives the virtual training data and performs active learning using the machine learning algorithm and virtual training data. If no bias is detected, the data sample is added to a testing dataset.

At 430, when bias is detected, label modifying module 94 of system 72, as executed by computer system/server 12, can consider a data point for label modification before discarding the data point permanently from a training iteration. At 440, label modifying module 94 modifies the value of the selected data point and determines whether the raw value of the modified data point is within a predefined tolerance and within a bin of a desired class. Note, the tolerance limit itself could change over the iterations such that the tolerance is made more lenient for each data point that has been discarded earlier. Also, in the later iterations in the lifecycle of a data point, where the data point was ignored earlier but currently selected, the tolerance might be made even more accommodative to try and incorporate the data and, if possible, will still discard the data if such increase in tolerance still fails to incorporate the data point. If the modified data point is within the predefined tolerance and within the bin of the desired class, the modified data point has a label of the target class is retained, at 450, and passed through the "inherently fair" process as described in detail above to monitor for any forms of bias that might affect the learning algorithm. If not, the data point can be discarded.

The process flowcharts of FIGS. 3 and 4 illustrate the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for reducing bias in active learning, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for reducing bias in active learning. In this case, the service provider can create, maintain, and support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for reducing bias in active learning. In this case, a computer infrastructure, such as computer system 12 (FIG. 1), can be provided and one or more systems for performing the processes of the invention can be captured (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media/(e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for reducing bias in active learning. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for reducing bias in active learning, comprising:
monitoring, upon adding a selected data point to a virtual training dataset, for data bias in the virtual training dataset;
modifying, when data bias is detected, the data point to generate a modified data point;
retaining the modified data point when a raw value of the modified data point is within a predefined tolerance and within a bin of a desired class, wherein the desired class includes a class label;
monitoring for data bias and model bias related to the modified data point and adding the modified data point to a testing dataset when no bias is detected related to the modified data point; and
dynamically changing the predefined tolerance.

2. The computer-implemented method of claim 1, further comprising monitoring, after performing active learning by executing a machine learning model using the virtual training dataset, for model bias related to the data point and modifying, when model bias is detected, the data point to generate a modified data point.

3. The computer-implemented method of claim 1, further comprising discarding the modified data point in response to a determination that a raw value of the modified data point is not within the predefined tolerance or not within the bin of the desired class.

4. The computer-implemented method of claim 1, further comprising generating the modified data point when (min(p−a, p−p)>=v) and (max(p+a, p+p)<=v), wherein v represents the raw value of the data point, a represents a standard deviation of a generated distribution, p represents a range limit of the generated distribution, and p represents a mean of the generated distribution.

5. A system for reducing bias in active learning, comprising:
a memory medium comprising program instructions;
a bus coupled to the memory medium; and
a processor, for executing the program instructions, coupled to a reduced bias active learning engine via the bus that when executing the program instructions causes the system to:
monitor, upon adding a selected data point to a virtual training dataset, for data bias in the virtual training dataset;
modify, when data bias is detected, the data point to generate a modified data point;
retain the modified data point when a raw value of the modified data point is within a predefined tolerance and within a bin of a desired class, wherein the desired class includes a class label;
monitor for data bias and model bias related to the modified data point and add the modified data point to a testing dataset when no bias is detected related to the modified data point; and
dynamically change the predefined tolerance.

6. The system of claim 5, the instructions further causing the system to monitor, after performing active learning by executing a machine learning model using the virtual training dataset, for model bias related to the data point and modify, when model bias is detected, the data point to generate a modified data point.

7. The system of claim 5, the instructions further causing the system to discard the modified data point in response to a determination that a raw value of the modified data point is not within the predefined tolerance or not within the bin of the desired class.

8. The system of claim 5, the instructions further causing the system to generate a modified data point when $(\min(\mu-\sigma, \mu-\rho)>=v)$ and $(\max(\mu+\sigma, \mu+\rho)<=v)$, wherein v represents a raw value of the data point, $\sigma$ represents a standard deviation of a generated distribution, $\rho$ represents a range limit of the generated distribution, and $\mu$ represents a mean of the generated distribution.

9. A computer program product embodied in a computer readable storage medium that, when executed by a computer device, performs a method for reducing bias in active learning, the method comprising:
monitoring, upon adding a selected data point to a virtual training dataset, for data bias in the virtual training dataset;
modifying, when data bias is detected, the data point to generate a modified data point;
retaining the modified data point when a raw value of the modified data point is within a predefined tolerance and within a bin of a desired class, wherein the desired class includes a class label;
monitoring for data bias and model bias related to the modified data point and adding the modified data point to a testing dataset when no bias is detected related to the modified data point; and
dynamically changing the predefined tolerance.

10. The program product of claim 9, the method further comprising monitoring, after performing active learning by executing a machine learning model using the virtual training dataset, for model bias related to the data point and modifying, when model bias is detected, the data point to generate a modified data point.

11. The program product of claim 9, the method further comprising discarding the modified data point in response to a determination that a raw value of the modified data point is not within the predefined tolerance or not within the bin of the desired class.

* * * * *